United States Patent
Khan et al.

(10) Patent No.: US 6,168,831 B1
(45) Date of Patent: Jan. 2, 2001

(54) APPARATUS FOR DIFFERENTIAL ZONE LUBRICATION OF MAGNETIC RECORDING MEDIA AND RELATED METHODS

(75) Inventors: M. Yunas Khan, San Jose; Bo Wei, Union City, both of CA (US)

(73) Assignee: Hyundai Electronics America, San Jose, CA (US)

( * ) Notice: Under 35 U.S.C. 154(b), the term of this patent shall be extended for 0 days.

(21) Appl. No.: 09/093,629

(22) Filed: May 22, 1998

(Under 37 CFR 1.47)

(51) Int. Cl.[7] .................................................... B05D 1/40
(52) U.S. Cl. ......................... 427/240; 427/337; 427/359; 118/696; 118/106; 118/107; 118/109; 118/52; 118/56; 118/257; 118/264
(58) Field of Search .................................. 118/106, 107, 118/109, 52, 56, 264, 696; 427/240, 355, 337, 359; 15/102; 184/102, 43; 428/65.4, 694 TF

(56) References Cited

U.S. PATENT DOCUMENTS

| | | | | |
|---|---|---|---|---|
| 4,895,098 | * | 1/1990 | Akagawa et al. | 118/106 |
| 5,674,582 | * | 10/1997 | Eltoukhy et al. | 428/65.4 |
| 5,863,609 | * | 1/1999 | Yamamoto | 427/355 |

* cited by examiner

Primary Examiner—Laura Edwards
(74) Attorney, Agent, or Firm—Townsend and Townsend and Crew LLP

(57) ABSTRACT

A method and apparatus for producing dual-zone lubricated magnetic disks. An absorbent medium is held against a selected portion of the surface of a lubricated disk. The disk is rotated in relation to the absorbent medium, and the absorbent medium removes mobile lubricant from the selected portion of the disk, leaving bonded lubricant in addition to a selected amount of mobile lubricant. In an specific embodiment, an absorbent tape is supplied to a roller that holds the tape against a surface of the disk, and solvent is applied to the tape and/or disk to facilitate the removal of mobile lubricant. Differential lubricant thicknesses are thus obtained.

14 Claims, 5 Drawing Sheets

APPARATUS FOR DIFFERENTIAL ZONE LUBRICATION OF MAGNETIC RECORDING MEDIA AND RELATED METHODS

BACKGROUND OF THE INVENTION

This invention relates to magnetic storage media, and in particular to rigid magnetic disks used in computer disk drives.

Computers and other types of equipment often read and write magnetic flux patterns from magnetic media. One of the preferred types of magnetic media is the rigid, or "hard", disk. Hard disk drives have been used in computer systems for over thirty years to store digital data, and offer low cost, high recording capacity, and relatively rapid data retrieval. While the basic principle of reading magnetic patterns on rotating disks remains the same, components of the disk drive, particularly the read-write head ("head") and the disks have significantly evolved.

The first disks were made by coating a rigid platter, as large as 24 inches in diameter, with magnetic particles, such as iron oxide particles, mixed in a resin. More recently, thin-film technology has been used to sputter a thin film of magnetic metal on a platter that is typically about 3.5 inches in diameter. A metallic film offers 100 times the magnetization of the older, particulate films, thereby producing the same amount of magnetic flux from a much thinner film. A thinner film allows more narrow magnetic cells, which represent a data bit, to be formed. The more narrow magnetic cell results in higher recording and storage densities. Additionally, a metallic thin film may be formed on a very smooth platter. Smooth films allow the head to "fly" closer to the magnetic cells, yielding higher readback amplitudes.

Surface roughness limits how low a head can approach the media, and adds to the overall noise contribution of the magnetic layer. Advancements in the design of recording heads, particularly the introduction of magnetoresistive (MR) heads, have required continuing reduction in surface roughness. Current MR media, capable of storing recording densities of 3 Gbit/in$^2$ have surfaces with roughness values of about 1 nm. Future surfaces for storing 10 Gbit/in$^2$ are expected to have roughness an order of magnitude lower than the current media.

Such smooth surfaces do not allow the head to land without suffering "stiction" forces. Stiction is a term commonly used in the disk drive industry to describe the sliding friction of a head across a disk as the disk accelerates in rotational velocity to its operating speed. The head will fly above the disk at the operating height once the disk is rotating at full speed. On start-up (when the disk is turned on and begins spinning) or in the event of a drop in rotational speed, the head may dip closer to the disk, resulting in stiction. Stiction forces may arise from a variety of sources, including a localized vacuum created between the head and the disk, and capillary action between liquid present on either the disk or the head.

To avoid excessive stiction on start-up some disks have textured landing zones, where the head can land when the disk is turned off. These landing zones are textured to allow the head to lift off the disk with no more than 1–2 grams of drag. These landing zones may also be lubricated with a liquid lubricant to further improve the contact-start-stop performance of the head. The lubricant is typically applied by dipping or spraying methods, which are quick and inexpensive, but which coat the entire disk with lubricant. Unfortunately, the presence of liquid lubricant in the data zone may create stiction problems in the data zone of the disk, and in the landing zone of the disk if the head picks up liquid lubricant from the data zone and transfers this excess lubricant to the landing zone.

SUMMARY OF THE INVENTION

The present invention provides an apparatus for achieving differential lubrication thicknesses between the landing zone and the data zone of a magnetic disk, and related methods.

In one embodiment, the apparatus rotates a lubricated magnetic disk on a spindle. A roller presses an absorbent tape against a selected portion of the disk and the absorbent tape extracts a portion of the mobile lubricant from the surface of the disk. The disk or roller move(s) laterally in relation to each other so that mobile lubricant is removed from a zone of the lubricated disk, such as the data zone, while mobile lubricant is left in another zone of the disk, such as the landing zone. In another embodiment, a solvent is applied to the absorbent tape and/or the disk to facilitate removal of mobile lubricant from the data zone.

A further understanding of the nature and advantages of the dual zone lubricated disk of the present invention may be realized by reference to the remaining portions of the specification and the attached drawings.

DESCRIPTION OF SPECIFIC EMBODIMENTS

Figure 1:
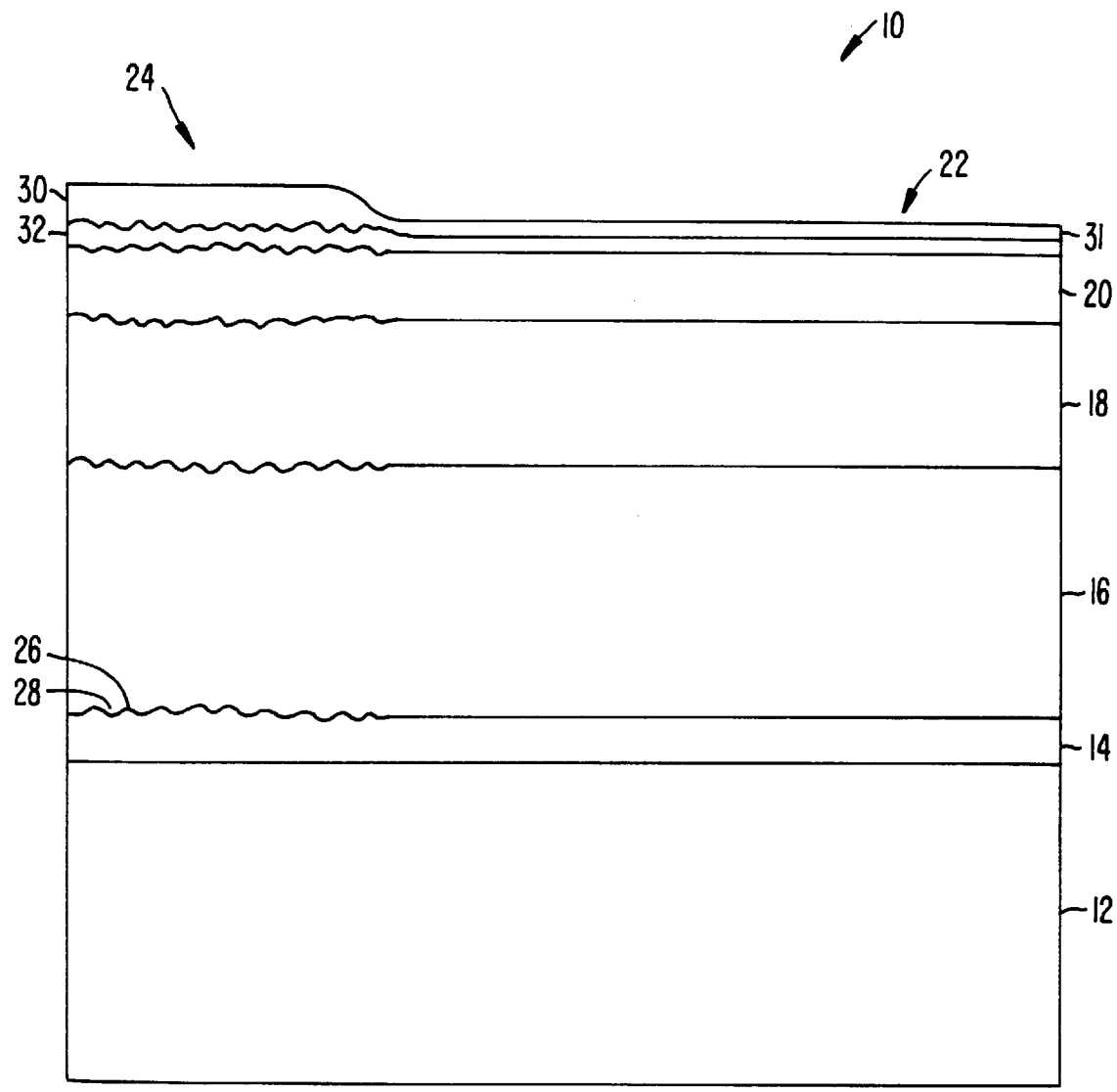
FIG. 1 is a simplified cross section of a portion of a dual zone lubricated thin film magnetic disk.

FIG. 1 is a simplified cross section, not drawn to scale, of a portion of a zone-lubricated thin film magnetic disk 10. The platter, or substrate, 12 is a 95 mm diameter aluminum-magnesium alloy that is plated with a hard nickel-phosphorous (Ni—P) coating 14. The Ni—P coating is first polished, and then textured, to a root-mean-squared (RMS) roughness ($R_q$) of about 1 nm. A nucleating underlayer 16 approximately 50 nm thick of chromium is sputtered onto the substrate and serves to nucleate grains of the subsequently deposited magnetic layer 18 in a preferred orientation. The preferred orientation of the magnetic layer presents an axis of relatively easy magnetization in-plane or nearly in-plane with the disk. This orientation achieves good magnetic hysteresis properties.

The magnetic layer 18 is a cobalt-based alloy about 30 nm thick that is sputtered onto the underlayer 16. The magnetic layer has a cobalt composition ranging from about 70–90 atomic percent. The remainder of the alloy includes chromium, tantalum and platinum or no platinum, which improve the coercivity of the magnetic layer. Even though the magnetic layer 18 is quite hard, an overcoat layer 20 approximately 13 nm thick is applied over the magnetic layer to protect the magnetic layer from damage during head landings at power shutdown, or from occasional low flying head excursions during file operation. The overcoat layer is a 10–15 nm thick sputtered coating of nitrogenated and/or hydrogenated carbonaceous material. The final layer of the thin film disk is a layer, or layers, of topically applied lubricant that reduce friction during head-disk contact.

The disk has two zones. The first is the data zone 22, which is smooth so that the recording head can fly close to the surface of the disk. The second is the landing zone 24, which is textured to improve the stiction, or glide friction, of the head in this region. The landing zone may be textured by using a focused laser beam to ablate a surface of a layer of the disk. For example, bumps 26 and craters 28 of appropriate size may be formed in the hard Ni—P coating 14 to result in a textured landing zone after formation of the overlying layers. The appropriate size of the bumps and craters depends on the thickness of the subsequent layers, the replication of surface features through those layers, and the final desired surface characteristics, among other factors.

The lubricant in the landing zone 24 consists of two layers, a mobile layer 30 and a bonded layer 32. The mobile layer 30 retains some fluid characteristics and improves contact-start-stop characteristics of the head in the landing zone. The lubricant in the data zone 22 consists of the bonded layer 32, and a mobile lubricant layer 31. In a specific embodiment, the original thickness of the lubricant layer (i.e. the thickness of layers 30 and 32) is about 20 Angstroms, the bonded layer 32 being about 5–8 (nominally 6) Angstroms thick. Hence, the original mobile lubricant layer is nominally about 14 Angstroms thick. The reduced mobile lubricant layer 31 in the data zone 22 is nominally about 8 Angstroms thick, but may be selectively varied according to the process described below.

The zone lubricated disk 10 has improved fly stiction performance compared to a disk that is not zone lubricated because of the reduced mobile lubricant in the data zone reduces the tendency for lubricant to accumulate on the head. A cleaner head (i.e. a head with less mobile lubricant adhering to it) is less likely to encounter excessive start-up stiction in the landing zone, less fly stiction in the data zone, and is less likely to accumulate dirt or dust particles.

One type of lubricant that can be used on a thin film magnetic disk is a perfluoropolyether lubricant. Various fluorocarbon lubricants have been used for lubricating magnetic disks, such as Z-DOL 2000™, Z-DOL 4000™, FOMBLIN® Am 2001™, and FOMBLIN® Am 3002™, all sold by AUSIMONT USA, Inc., of Thorofare, N.J. Other lubricants, such as DEMNUM™, sold by Nagase Corporation of Japan, and phosphorous-based or phosphorine-based lubricants, such as XUS 13210.00™ and X1-P™, both sold by THE DOW CHEMICAL COMPANY of Midland, Mich., may also be used. These lubricants can be used with or without additives and are applied to the disk by dipping the disk in lubricant or spraying the disk with lubricant. Both methods economically apply a lubricant to a disk. The total thickness of the dipped or sprayed lubricant is typically between about 1.0–3.0 nm thick.

A portion of the lubricant chemically bonds to the underlying overcoat layer 20. Typically, about 20–30% of the thickness of the applied lubricant bonds to the overcoat layer. A portion of the unbonded, or mobile, lubricant is removed from the data zone 22 by an extraction process. In one embodiment, a tape extraction process produces a disk with sufficient mobile lubricant in the landing zone for good contact-start-stop performance, while reducing fly stiction, contamination, and lubrication pick-up by the head in the data zone.

Figure 2:
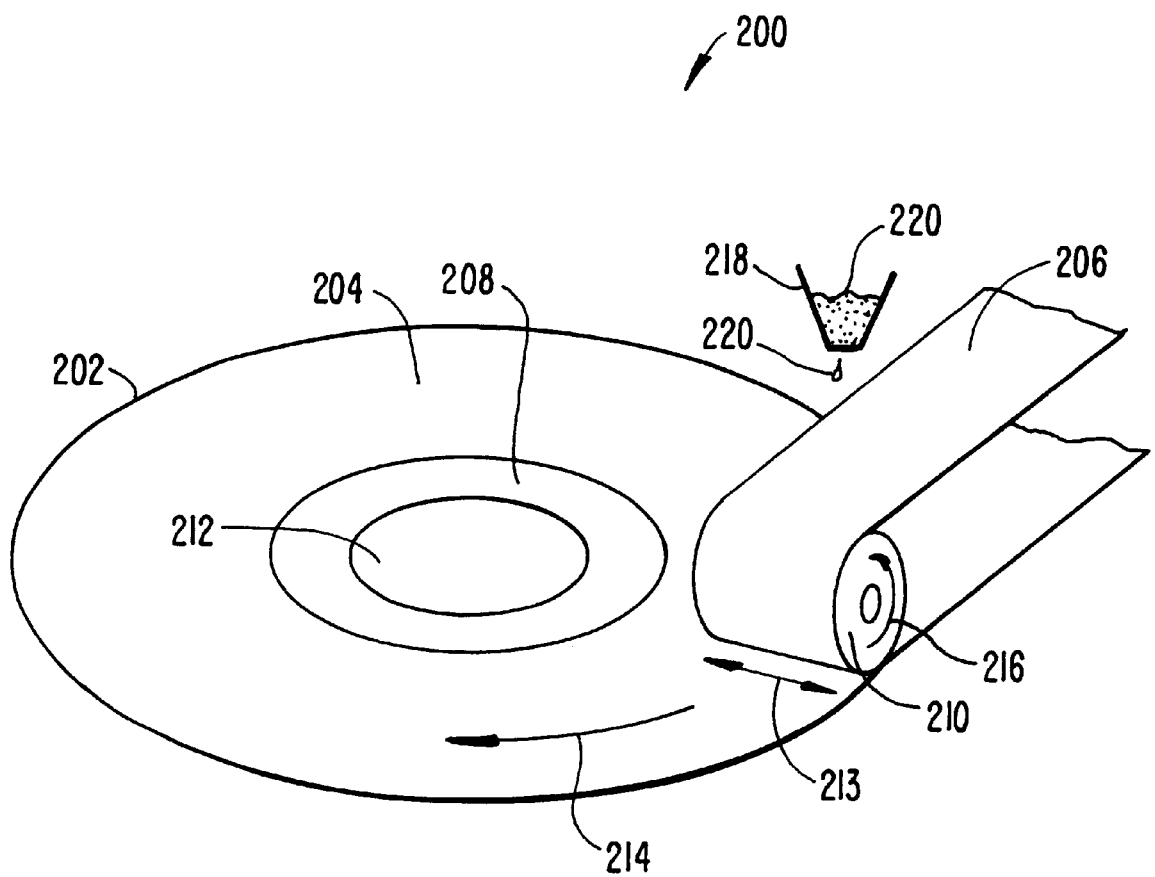
FIG. 2 is a simplified representation of an apparatus for producing variable lubricant thickness on a magnetic disk according to one embodiment of the present invention.

FIG. 2 is a simplified representation of a portion of a tape extraction apparatus 200. A thin-film disk 202 has been coated with lubricant (not shown) so that both a mobile layer and a bonded layer of lubricant initially exists in the data zone 204. An absorbent tape 206 extracts mobile lubricant, but not bonded lubricant, from the data zone 204 while the disk spins, leaving mobile lubricant in the landing zone 208.

The tape is typically a polyester, cotton, or cotton-polyester blend, although other types of materials may be used. Examples of suitable tapes include TORAYSEE & LUMINEX MT™ tape, sold by TORAY INDUSTRIES, INC., of Tokyo, Japan, polyester tape #14100™ sold by MIPOX INTERNATIONAL CORPORATION, of Hayward, Calif., and TX041A™ and TX031Q™, both sold by THE TEXWIPE COMPANY, LLC of Upper Saddle River, N.J. In a specific embodiment, the tape is made from 100% polyester with a fiber diameter of 2 microns in a back satin weave with a needle napping treatment. In another embodiment, the tape is a polyester/cotton blend woven in a 2×2 left handed twill with the warp being 40% polyester and 60% cotton, and the fill being 50% polyester and 50% cotton. The warp is 15.5/1's and the fill is 19/1's, woven in an 84×40 weave. In a third embodiment, the tape is 100% cotton in a 2×2 twill pattern with a 21 count warp and a 30 count fill and having a weave of 118×60. The tape is typically about 1.375 inches wide; however, other tape widths or materials would work.

A roller 210 presses the tape 206 against the disk 202. The roller is made from a compliant material, such as polyurethane or nitrile-butadiene rubber, with a hardness of between about 10–90 Durometers. Fresh tape is supplied to the roller from a source spool (not shown) at a rate of between about 2–30 inches per minute, and used tape is accumulated on a take-up spool (not shown). Alternatively, the used tape could be accumulated in a waste bin.

The length of the roller is chosen according to the width of the tape. The roller is typically slightly longer than the width of the tape. For example, a roller about 1.94 inches long was used with a tape 1.375 inches wide. A typical disk may have an outside diameter of about 3.5 inches, with a center hole 212 up to about 1.0 inches in diameter. The radial distance between the edge of the center hole and the outer edge of the disk is slightly less than the tape width. Therefore, the roller 210 is on an arm (not shown) that oscillates across the data zone 204 of the disk, as shown by the arrow 213 as the disk spins, so that the mobile lubricant extraction tape will contact the data zone of the disk but not the landing zone.

The disk spins in the direction shown by the arrow 214 at a rate of between about 100–1500 RPM. The absorbent tape removes mobile lubricant from the data zone 204. The tape 206 is advanced around the roller 210 in the direction shown by the arrow 216 to provide fresh tape as the tape removes mobile lubricant from the surface of the disk. The excursion of the roller is limited in range so that the tape does not remove mobile lubricant from the landing zone 208. Alternatively, the roller may be held stationary and the disk moved relative to the roller, or the roller may apply a tape across the entire width of the data zone without motion between the roller and the disk.

An optional solvent dispenser 218 may dispense solvent 220 onto the tape 206. The type of solvent is chosen to be appropriate for the type of lubricant used. For example, VERTREL® XF, made by the Du Pont Company of Wilmington, Del., is an appropriate solvent to use with, ZD0l, Demnum, ZD0l-XIP mixture, and similar type lubricants. Other solvents, such as PF-5060™ Brand Performance Fluid and HFE-7100™ Speciality Liquid, both made by the 3M Company of Saint Paul, Minn., and methanol, may be used. Additionally, the performance of a solvent may be modified by the use of azeotropes, alcohols, hydrocarbons, esters, and other compounds. For example, methanol may be blended with VERTREL® XF.

The solvent dispenser may dispense solvent at a rate of 0.1 to 5.0 ml per minute. The solvent dispensing rate depends on the type of tape, the type of solvent, the type of lubricant, the tape speed, the amount of mobile lubricant desired to be removed, and other parameters.

The amount of mobile lubricant removed from the data zone is selectively controllable according to the absorbency of the tape, the force applied, the number of passes of the surface of the disk against the tape, the activity of the solvent, and other parameters. In a preferred embodiment, up to about 40% of the mobile lubricant is removed from the data zone. In an alternative embodiment, copious solvent is used to saturate the absorbent tape to essentially perform a solvent wash over a selected portion of the disk to remove over 75% of the mobile lubricant from the data zone.

Figure 3:
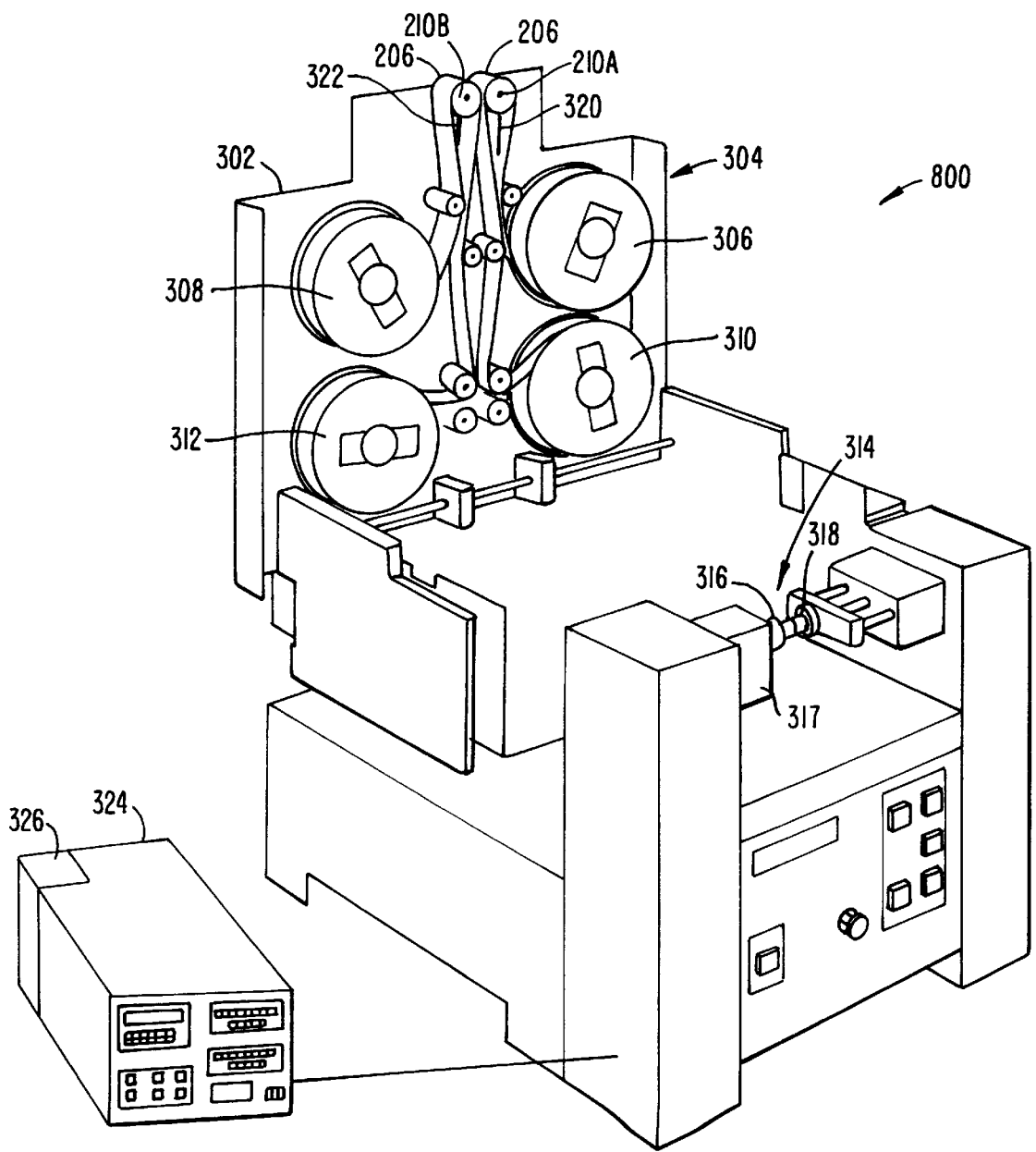
FIG. 3 is a simplified view of a portion of a disk finishing system that has been adapted for the production of dual-zone lubricated magnetic disks.

FIG. 3 is a simplified diagram of a mobile lubricant tape extraction apparatus according to one embodiment of the present invention. The tape extraction apparatus is a modified EDC™ 800 SERIES AUTOMATED SURFACE FINISHER, made by the EXCLUSIVE DESIGN COMPANY, INC., of Fremont, Calif.

Surface finishers are typically used in a disk texture, tape burnish, or lube-buff process. Such processes typically cover the entire disk surface. The tape burnish process typically uses an abrasive to remove the high asperities from the disk surface that remain after the coating process. The tape burnish process is typically performed with an abrasive tape ("attached" abrasive), a non-abrasive tape with an abrasive slurry ("free" abrasive) applied to it, or an abrasive tape with an abrasive slurry applied to it.

The lube-buff process is used to ensure that the lubricant is evenly dispersed over the disk surface. Although lube-buff processes are generally proprietary, such processes typically involve moving a fabric tape across the surface of the disk such that a hydrodynamic layer is formed from "excess" lubricant between the tape and the surface of the disk. However, it is believed that the model of "excess" lubricant is incorrect. Rather, it appears that the buffing tape scrapes mobile lubricant from the asperities on the disk surface into the depressions on the disk surface, thus creating lightly coated projections and filled indentations. A desired result of some lube-buff processes is to connect all indentations with a layer of mobile lubricant, so that the lubricant may flow into a layer under the influences of gravity and surface tension.

FIG. 3 is a simplified view of a portion of a modified surface finisher 800 that has been adapted for lubricant extraction. The top 302 of the surface finisher has been opened to show the upper magazine 304. The upper magazine has a first source spool 306, a second source spool 308, a first take-up spool 310, and a second take-up spool 312. Absorbent tape 206 has been loaded onto the first and second source spools 306,308. A similar lower magazine is typically available and may optionally be used instead of, or in conjunction with, the upper magazine.

As the tape is used to extract mobile lubricant from the data zone of the disk, it is accumulated on the first and second take-up spools 310, 312. Alternatively, the used absorbent tape could be accumulated in a waste bin, thus reducing tape loading time, as only the source spools would need to be changed out when a new spool of tape was needed. The first and second source and take-up spools allow both surfaces of a disk to be processed simultaneously.

During operation, the top 302 of the surface finisher is folded down so that the spools rotate in a horizontal plane. A disk (not shown) is placed on the spindle assembly 314 and would rotate in a vertical plane, although it is understood that "horizontal" and "vertical" are terms that are used solely for illustration and are not limiting. The spindle assembly 314 includes a drive spindle 316, a motor, 317, and an idler spindle 318. The spindle assembly is easily removed and replaced to accommodate disks with different internal diameters.

The absorbent tape 206 is held against one side of the disk by a first ("upper") roller 210A and the other side of the disk by a second ("lower") roller 210B. The rollers are approximately 2 inches in diameter and 1.94 inches long, although other dimensions could be used. The rollers are mounted on oscillating arms 320, 322 that sweep the rollers, and hence the absorbent tape, across the data zone of the disk to remove mobile lubricant while leaving a layer of bonded lubricant. Alternatively, the width of the tape and/or roller could be matched to the desired width of the data zone on a disk so that oscillating arms would not be necessary. Process disks may be automatically transferred from the spindle to multi-disk cassettes (not shown).

The lube extraction system may be controlled by a digital electronic controller 324, such as a digital computer. The digital electronic controller 324 configures a properly adapted disk finishing system to produce dual-zone lubricated disks. A system-control software program stored in a computer-readable medium 326, such as a read-only memory (ROM), programmed electronic memory, such as RAM or flash memory, or a magnetic medium, such as a diskette, tape, or hard disk. Although the computer-readable medium 326 is shown as being incorporated as part of the controller 324, it is understood that the computer-readable medium may be external, such as an external disk drive or an external memory coupled to the controller.

Many parameters of the disk finishing system may be controlled manually or according to the system-control software program for dual-zone lubricated disk manufacturing, including spindle speed, tape drive speeds, load roll forces, solvent delivery rate, load roll skew, event timing, and event sequence. The load roll force is programmed to be about 0.1–10 pounds, preferably 2±1.0 lbs for a polyurethane or nitrile butadiene rubber roller with a durometer of 45±10. It is understood that the force applied to the surface of the disk may be the same as or different from the load roll force, as the tape may have tensile forces that support part of the load roll force. The spindle speed is programmed to be about 10–2000 RPM, preferably about 900±600 RPM. The tape speed is programmed to be about 2–30 inches per minute, preferably about 15±7 inches per minute for a TX031Q or TX041A or MIPOX #14100 tape. The tape speed of the upper roller may be the same as, or different from, the tape speed of the lower roller. The gap between the roller and disk surface can be programmed to be between about 0.01–0.06 inches, and is nominally 0.035 inches for the above tape. The rate of solvent dispensing can be programmed to be about 0.1–5.0 ml/min., and is 1.5 ml/min. for Vertrel XF or Methanol or HFE solvent, which is compatible with a disk lubricated with ZD01 or Demnum or ZD01-XIP mixture lubricant. The oscillation frequency of the arms across the data zone of the disk can be programmed to be about 0.5–10 Hz, and is 5 Hz in a specific embodiment. The travel of the arms is also selected so that the absorbent tape does not extract lubricant from the landing zone of the disk. In a specific embodiment, the landing zone extended 0.78 inches from the center of the disk, and the arm travel was programmed so that the absorbent tape did not contact this zone. The particular travel of the arms depends on the desired width of the landing zone, the diameter of the disk, the type and width of the roller used, the type and width of the absorbent tape used, and other factors.

It is understood that several parameters may be dependant on each other. For example, the tape speed may depend on the type (absorbency) of the tape, the type of mobile lubricant to be extracted, the type of solvent used, if any, the rate of solvent application, the spindle speed, the roller force, and the oscillation frequency of the arms.

Figure 4:
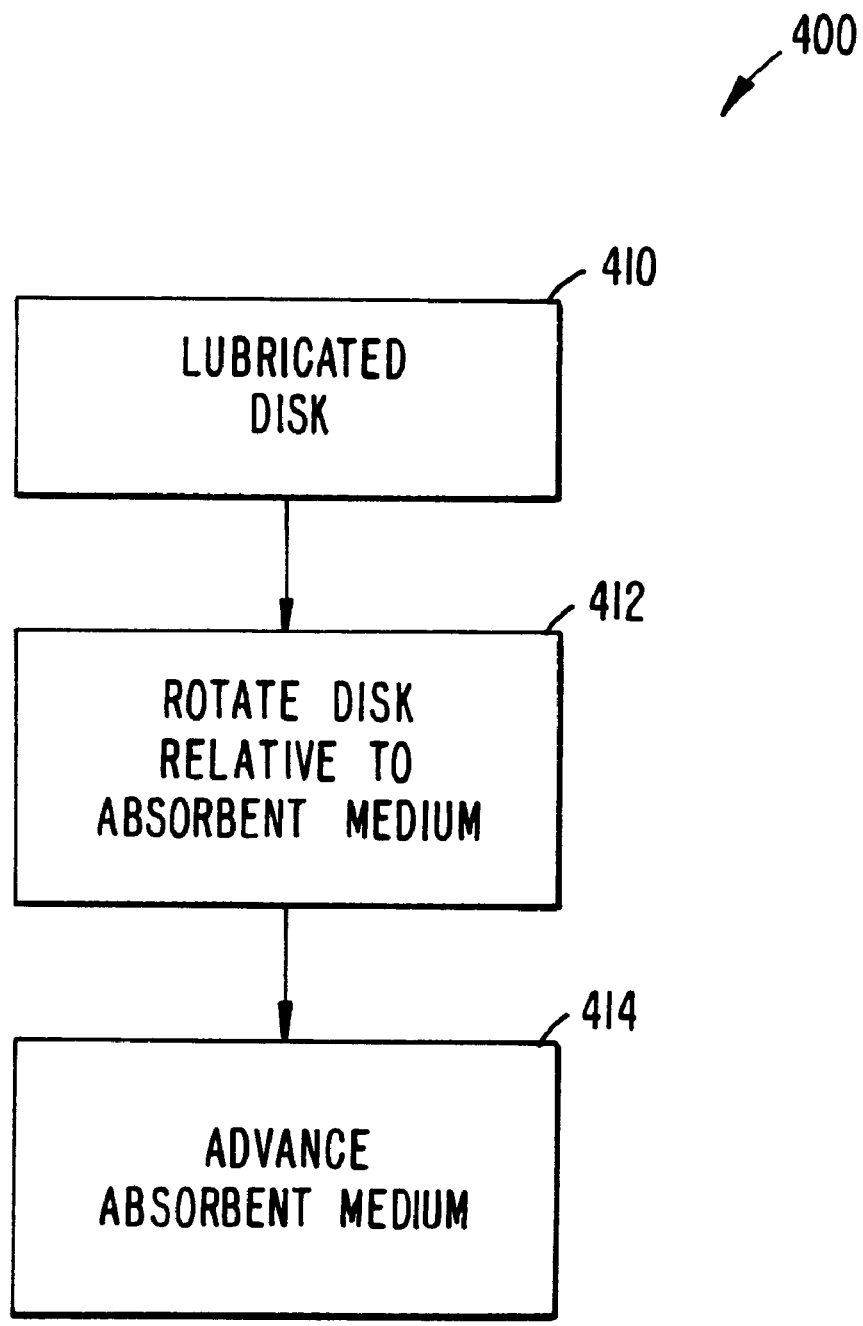
FIG. 4 is a simplified flow chart of a method for producing dual-zone lubricated disks.

FIG. 4 is a simplified flow chart of a process 400 used for manufacturing a dual-zone lubricated disk. A lubricated disk is provided (step 410) and rotated (step 412) relative to an absorbent tape pressed against a surface of the disk, which extracts mobile lubricant from a portion (i.e. the data zone) of the disk. The absorbent tape is advanced (step 414) to provide fresh tape to contact the surface of the disk.

Figure 5:
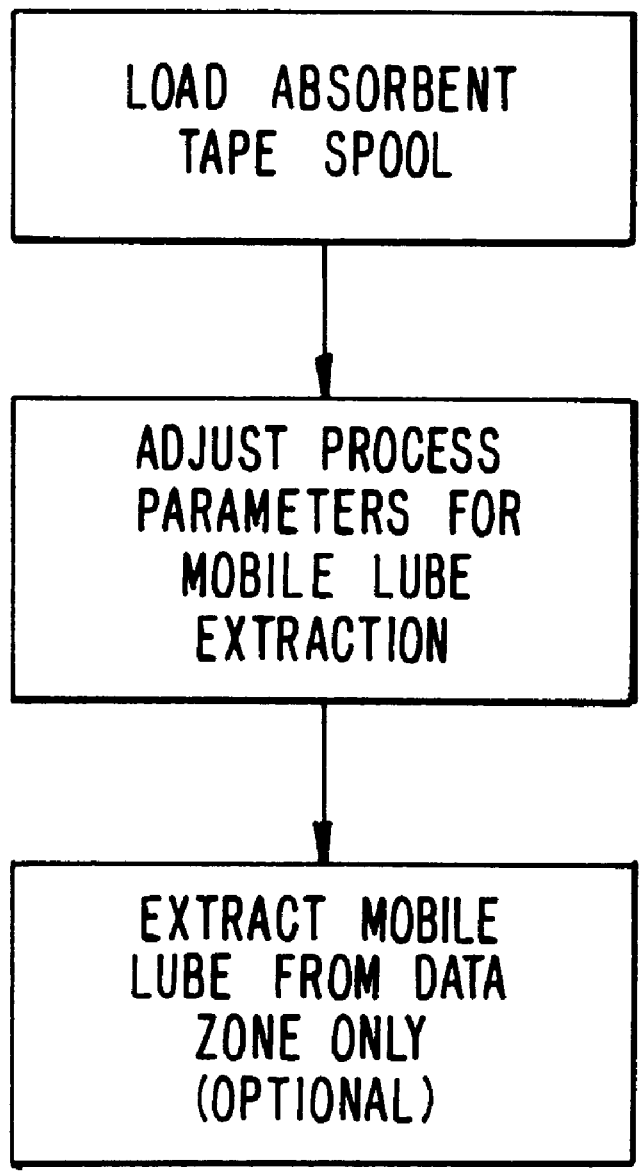
FIG. 5 is a simplified flow chart of a method for configuring a surface finishing system to an apparatus for producing dual-zone lubricated magnetic disks.

FIG. 5 is a simplified flow chart of a process 500 for configuring a disk surface finisher into a dual-zone lubricant disk manufacturing apparatus. Absorbent tape is loaded into a source spool of the disk surface finisher (step 510). Process parameters are adjusted to extract mobile lubricant from a surface of a disk. As described above, the process parameters may be adjusted according to a system control program stored in a computer-readable medium. A process contact area between the absorbent tape and the surface of the disk is selected to leave a zone of the surface of the disk from which mobile lubricant is not extracted (step 512). The process contact area may be selected by altering the width of the tape and/or roller, and/or by adjusting the travel of the oscillating arm, if any. Lube extraction solvent may optionally be supplied (step 514) to the system to assist in the mobile lube extraction process.

While the above is a complete description of specific embodiments of the present invention, various modifications, variations, and alternatives may be employed. For example, a rigid, rather than compliant, roller could be used, a compressible tape could be used, or a static bar could be used instead of a roller. The scope of this invention, therefore, should not be limited to the embodiments described, and should instead be defined by the following claims.

What is claimed is:

1. An apparatus for removing mobile lubricant from a first selected portion of a surface of a lubricated magnetic disk, the apparatus comprising:
   a spindle configured to rotate the magnetic disk;
   a motor coupled to the spindle to rotate the spindle and the disk;
   an oscillating roller for guiding an absorbent tape thereover; and
   an absorbent tape guided over the roller so as to contact only the first selected portion of the surface of the lubricated magnetic disk as the disk is rotated, the surface having a layer of bonded lubricant and a layer of mobile lubricant, so as to absorb and thereby remove mobile lubricant from only the first selected portion of the surface of the lubricated magnetic disk and to leave the layer of bonded lubricant on the first selected portion of the surface of the lubricated magnetic disk, while leaving mobile lubricant on a second selected portion of the surface of the lubricated magnetic disk.

2. The apparatus of claim 1 wherein the absorbent tape is formed from a material selected from the group consisting of polyester, cotton and a polyester-cotton blend.

3. The apparatus of claim 1 wherein the absorbent tape is dispensed from a source at a selected rate.

4. The apparatus of claim 3 wherein the selected rate is between about 2–30 inches per minute.

5. The apparatus of claim 3 wherein the selected rate is between about 8–22 inches per minute.

6. The apparatus of claim 1 wherein the roller is arranged to press the absorbent tape against the first selected portion of the surface.

7. The apparatus of claim 6 wherein the roller has a durometer of between about 35–55.

8. The apparatus of claim 6 wherein the roller presses the absorbent tape against the first selected portion of the surface with a force of between about 1–3 pounds.

9. The apparatus of claim 1 further comprising a solvent dispenser that applies a solvent to the absorbent tape at a selected rate, the solvent assisting in extracting mobile lubricant from the first selected portion of the surface.

10. The apparatus of claim 9 wherein the solvent comprises methanol.

11. The apparatus of claim 9 wherein the selected rate is between about 0.1–5 ml/min.

12. An apparatus for removing mobile lubricant from a first selected portion of a surface of a lubricated magnetic disk over which surface a mobile lubricant layer of said mobile lubricant extends, the apparatus comprising:
    a spindle configured to rotate the magnetic disk;
    a motor coupled to the spindle for rotating the disk at a selected speed between about 300–1500 RPM;
    a source of absorbent tape from which source absorbent tape is dispensable at a selected rate of about 15 inches per minute; and
    a roller over which the absorbent tape is guided to travel, the roller having a durometer of about 45, the roller configured to apply a selected force of about 2 pounds through the absorbent tape to the disk, wherein the roller is oscillatable relative to and across the first selected portion of the surface of the disk so as to cause the absorbent tape to absorb and thereby remove about 10%–80% of the mobile lubricant layer from the first selected portion of the surface of the disk while leaving the mobile lubricant layer on a second selected portion of the surface of the lubricated magnetic disk, the second selected portion extending from an inner diameter of the disk to about 0.78 inches from a center of the disk.

13. A disk surface finishing system configured to produce dual-zone lubricated magnetic disks, the system comprising:
    an absorbent tape source from which absorbent tape is to be dispensed at a selected rate;
    a roller over which absorbent tape from the source is to be guided, the roller being arranged to apply a selected force through the tape to a surface of a lubricated disk, the lubricated disk and the roller being arranged to oscillate relative to each other;
    a motor-driven spindle on which the lubricated disk is mountable for rotating the lubricated disk at a selected speed;
    a controller for controlling the selected dispensing rate of the absorbent tape from the source, oscillation between the roller and the disk, the selected force of the roller, and the selected speed of the motor-driven spindle; and
    a memory coupled to the controller, the memory including a computer-readable medium having a computer program embodied therein for directing the operation of the disk surface finishing system, the computer program including:

a first set of computer instructions for controlling the selected dispensing rate of the absorbent tape from the source;

a second set of computer instructions for controlling the roller to apply the selected force to the disk;

a third set of computer instructions for controlling the motor to drive the spindle to rotate at the selected speed; and a fourth set of computer instructions for controlling relative oscillation between the lubricated disk and the roller, thereby to cause the absorbent tape to absorb and thereby to remove mobile lubricant from only a selected first portion of the lubricated disk and to leave mobile lubricant on a second selected portion of the lubricated disk.

14. A computer program product for adapting a surface finishing system to produce dual-zone lubricated disks, the computer program product comprising:

a computer-readable storage medium; and a computer-readable program embodied in the computer-readable storage medium, the computer-readable program comprising:

a first set of instructions for controlling a dispensing rate of an absorbent tape from an absorbent tape source so as to cause the source to dispense absorbent tape at a selected rate;

a second set of computer instructions for controlling a selected force between a roller and a lubricated disk;

a third set of computer instructions for controlling a motor-driven spindle, for holding said lubricated disk, to rotate at a selected speed; and a fourth set of computer instructions for controlling oscillation between the lubricated disk and the roller thereby to cause the absorbent tape to absorb and thereby to remove mobile lubricant from a selected first portion of the lubricated disk and to leave mobile lubricant on a second selected portion of the lubricated disk.

* * * * *